(12) United States Patent
Heckl et al.

(10) Patent No.: US 6,387,282 B1
(45) Date of Patent: May 14, 2002

(54) METHOD OF DRYING A FILTER CAKE AND A PRESS FOR CARRYING OUT THE METHOD

(75) Inventors: Franz Heckl, Senden; Rolf F. Buhl, Köln; Manfred Weiler, Senden, all of (DE); Qian Zhu, Shanghai (CH); Mathias Zick, Senden (DE)

(73) Assignee: Lenser Filtration GmbH & Co., Senden (DE)

( * ) Notice: Subject to any disclaimer, the term of this patent is extended or adjusted under 35 U.S.C. 154(b) by 0 days.

(21) Appl. No.: 09/449,690

(22) Filed: Nov. 24, 1999

(30) Foreign Application Priority Data

Aug. 26, 1998 (DE) .......................... 198 43 028

(51) Int. Cl.$^7$ .............................................. B01D 25/21
(52) U.S. Cl. .................. 210/770; 210/774; 210/775; 210/180; 210/184; 210/185; 210/225; 210/228; 210/416.1; 34/398; 34/412
(58) Field of Search ................. 210/742, 770, 210/774, 775, 180, 184, 185, 224–231, 350, 416.1; 34/69, 92, 380, 388, 397, 398, 412

(56) References Cited

U.S. PATENT DOCUMENTS

| 1,049,715 A | * | 1/1913 | Hopkins et al. |
| 4,608,164 A | * | 8/1986 | Neu |
| 4,999,118 A | * | 3/1991 | Beltchev |
| 5,558,773 A | * | 9/1996 | Algeldinger et al. |

FOREIGN PATENT DOCUMENTS

WO  WO 95/27550  * 10/1995

* cited by examiner

Primary Examiner—W. L. Walker
Assistant Examiner—David Sorkin
(74) Attorney, Agent, or Firm—Herbert Dubno (57) ABSTRACT

The filter cake in a filter press is heated by direct contact with a heating plate opposite the pressing membrane so that a vapor phase is generated which moves uniformly in a planar pressure front through the filter cake to dry residual liquid therefrom. The filter cake is maintained under vacuum during the drying step.

5 Claims, 11 Drawing Sheets

METHOD OF DRYING A FILTER CAKE AND A PRESS FOR CARRYING OUT THE METHOD

FIELD OF THE INVENTION

Our present invention relates to a method of drying a filter cake and to a press for carrying out that method. More particularly, the invention relates to a filtration method which involves the drying of filter cakes formed in filter chambers of a filter press and to a filter press for carrying out that method.

BACKGROUND OF THE INVENTION

Filter presses using membrane filter elements and in which a filter cake is formed in each of the filter chambers and the membrane can be pressed by fluid pressure against the filter cake to press liquid therefrom are used for the separation of liquids from solid matter in suspension. The filter cake liquid which is expressed from the filter cake may be the original suspending liquid and/or liquid which is contacted with the solids in a washing operation, the washing liquid being pressed out of the filter cake at least in part by the membrane.

The filter cake can then be heated and the filter chamber evacuated.

EP 0 676 225 describes a filter plate for a multichamber filter press which can carry out such a process. However, the energy consumption and time required to reach a certain residual moisture content of the filter cake is relatively high. As a consequence a separate drying apparatus usually must be provided in order to achieve the desired reduction in the moisture content of the solids or the increase of the solids content of the product.

OBJECTS OF THE INVENTION

It is the principal object of the present invention, therefore, to provide an improved method of operating a filter press which can lead to a higher degree of drying of the filter cake than has been possible heretofore without significant additional cost with respect to energy and capital cost.

Another object of this invention is to provide a method of drying the filter cake in a multichamber membrane-tight filter press which can lead to a dryer filter cake, i.e. a filter cake with greatly reduced liquid content and increased solids content without a need for expensive materials with high temperature resistance.

Still another object of the invention is to provide an improved multichamber filter press utilizing membrane filter elements which can be operated more efficiently from an energy-consumption point of view and which does not need materials resistant to high temperature to achieve a high degree of dryness.

Yet another object of this invention is to provide a filter press which is free from drawbacks of earlier multichamber filter presses.

SUMMARY OF THE INVENTION

These objects and others which will become apparent hereinafter are achieved, in accordance with the invention by heating the filter cake exclusively from the side thereof turned away from the membrane filter element and under such conditions that the temperature, considering the reduction of the boiling point of the liquid phase resulting from the application of vacuum, is sufficiently high as to generate a vapor layer which advances through the filter cake with a vapor layer front that is substantially planar and uniform so that the vapor layer penetrates through the filter cake and drives out the residual liquid of the filter cake toward drainage surfaces of the unheated membrane. The heating is carried out over the area of the filter cake so uniformly that the transition zone between the vapor phase and the liquid phase is planar, homogeneous and advances through the filter cake without liquid breakthrough of the vapor.

More particularly, the method of the invention for separating solids from a liquid of a suspension in filter chambers provided with respective membrane filter elements and in which a respective filter cake is formed in each chamber and is subjected to an aftercompression phase by the respective membrane filter element, in its drying operation, can comprise the steps of:

(a) heating each filter cake along a supported side thereof opposite a side along which a respective membrane filter element is provided;

(b) simultaneously subjecting the filter cakes to a vacuum to reduce a boiling point of the liquid in the filter cakes; and (c) controlling the temperature to which each filter cake is heated at the supported side thereof so that a vapor layer is formed at the supported side and is propagated uniformly through the filter cake to drive residual liquid out of the filter cakes toward drainage surfaces of respective unheated membrane filter elements, the heating being effected over the entire area of each filter cake so that a transition zone between each vapor layer and the respective residual liquid of each filter cake transits through the filter cake homogeneously in a plane and without local vapor breakthroughs.

The advantage achieved with the method of the invention is a quantitatively higher degree of removal of the residual liquid because the latter is driven out mechanically by the advance in the vapor phase. The advancing vapor phase thus acts synergistically with the action of the vacuum and vice versa to permit the removal of the residual moisture, the vacuum simultaneously reducing the boiling temperature of the liquid phase, thereby eliminating the need for expensive high-temperature materials in the region of the membrane filter element. While the residual moisture is usually water, the invention is applicable to liquids which may be organic or inorganic solvents, oil and other liquids.

Preferably the vacuum is applied commencing with the afterpressing phase of the press operation, i.e. before commencement of heating, thereby further accelerating the drying process. It has also been found to be advantageous to apply the vacuum intermittently rather than continuously and with intervals of durations between intervals of vacuuming applications which can depend upon the solids which are recovered and the liquids which are removed. It has been found to be advantageous, moreover, to begin the heating of the filter cake at its side remote from the membrane filter element during the afterpressing phase as well.

In order to achieve optimal heating and a high heat transfer, the filter cake can lie directly against the surface of the heating element.

It has been found to be advantageous with respect to the high heat-transfer rate, to maintain the filter cake during the drying under the afterpressure applied by the membrane, the afterpressure being adjusted to be greater than the vapor pressure of the filter cake liquid. This stabilizes the filter cake in the filter chamber and compensates for the shrinkage of the filter cake as the residual liquid is removed so that the deterioration of the filter cake and formation of cracks or crevices therein through which vapor breakthroughs can develop, are avoided.

It has been found to be advantageous further to provide the membrane pressurization medium so that it is a heating or cooling fluid and thus can adjust the temperature differential across the filter cake. This allows optimization of the drying process since it enables the temperature difference across the filter cake to be adjusted or the temperature at the drainage side of the filter cake to be matched to the particular requirements of the process. As noted, the fluid may act as a heating fluid or as a cooling fluid.

From the apparatus point of view, the filter press can comprise a plurality of filter chambers separated by respective heating plates and each provided with a respective membrane filter element which can be covered by a respective filter cloth. The membrane filter element, in turn, can flank respective support plates which likewise separate the chambers from one another, the support plates forming frames at which the membranes are affixed thereto. A suspension inlet may extend through the support plates and the heating plates to feed the suspension to the respective chambers and drainage passages may be formed at the sides of the membranes.

The membranes can be sealed at their edges to the support plates or can be integral therewith and seals at the periphery may be provided between each frame and the respective heating plate. The filter cloths can be clamped to the frames along the peripheries thereof and the membranes can have drainage channels for the filtrate beneath the respective filter cloth. In any case between each two membrane filter elements, a respective heating element or plate is provided and over the entire periphery of the filter surface uniformly distributed filtrate run-off bores can be provided.

To ensure a sufficiently large flow cross section for the discharge liquid, especially because of the use of a vacuum to promote the discharge of the liquid, it has been found to be advantageous to provide in corner regions of the membrane filter elements, filtrate runoff passages which have a configuration optimized as to cross sectional area, preferably a triangular cross section.

With a view to high operating efficiency it is advantageous to provide the plate frame with a vacuum-tight edge seal and to integrate the filter cloth clamp within the edge seal.

To obtain heat transfer which is as good as possible from the heater to the filter cake, the heating elements can be plates provided from a material with high thermal conductivity and/or high chemical resistance.

The shape of the heating elements can vary widely. However, the heating element on its side turned toward the filter cake and hence toward the membrane filter element of the respective chamber can be planar or can be dished to form a cake-receiving depression and the surface of this heating plate can be free from drainage channels. It is however also possible to provide the surface in contact with the filter cake of the heating plate with a contour or profiling so that the contact area is increased for greater heat transfer without undesirably increasing the adhesion force of the filter cake to the surface of the heating element. In general that adhesion force is substantial in any event.

To facilitate the separation of the filter cake from the heating element or plate following the drying operation, it is advantageous to provide the surface element of the heating element at least in the region in which it contacts the filter cake with an antiadhesive coating, preferably of polytetrafluoro-ethylene (PTFE). The surface can have high or bright polish for this purpose as well.

The heating elements themselves can be formed in a single piece or can be composed of one or more pieces and the parts of the heating element can be cemented, welded or bolted together, e.g. with the aid of seals. It is also possible to provide the heating element with round and/or oval and/or rectangular heating passages and other cross sectional shapes are conceivable as well. The heating elements can be formed by machining or by casting and it is possible to provide the heating elements with electrical heating conductors although in this case corresponding heating sheets which can be composed of metal fabric can be used as well. What is important of course is that the heat be emitted from the heating plates or elements uniformly or homogeneously and this can be ensured by making the heating passages in the configuration of a meander.

Finally the heating elements can be thermally insulating in the edge region of the frames and the thermal insulation material can avoid radiating heat to all surfaces which are not in contact with the filter cake.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
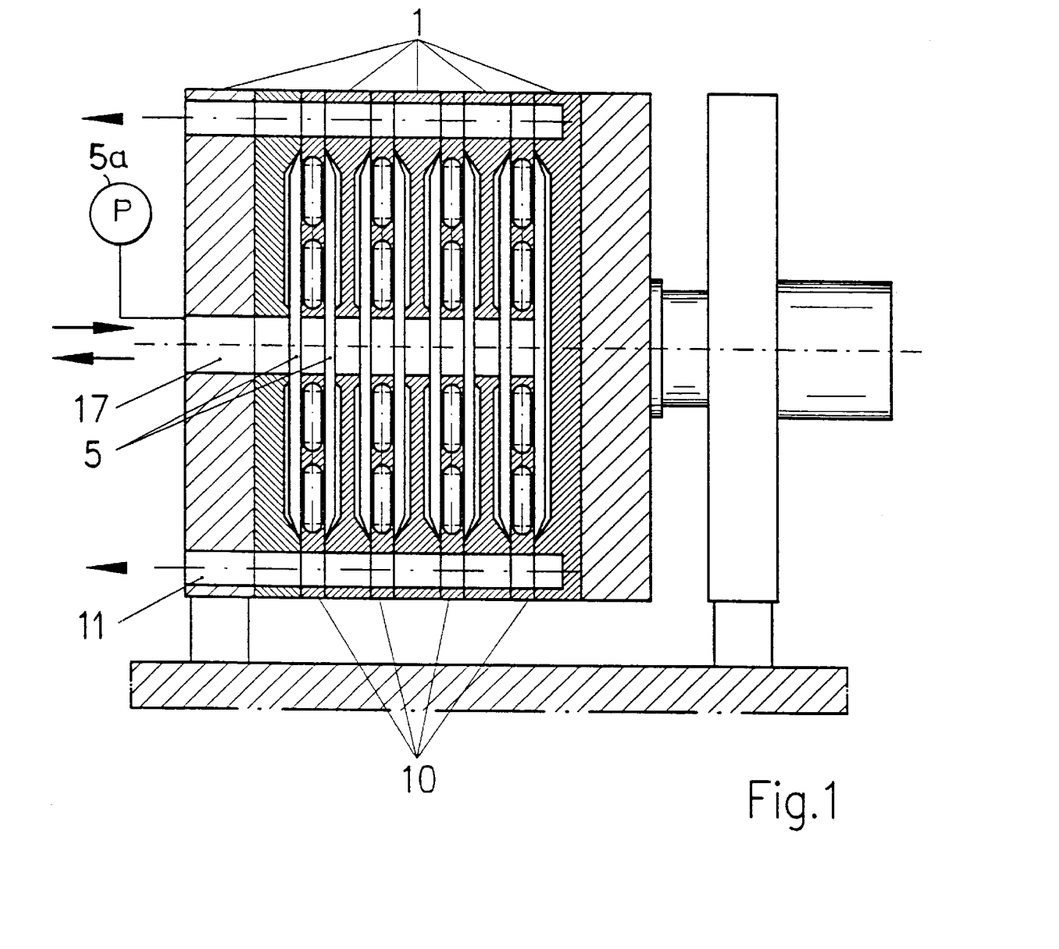
FIG. 1 is a cross sectional view diagrammatically showing a filter press in accordance with the invention.

The filter press shown in the drawing is comprised of membrane filter elements 1 carried by respective support walls 2 and which are clamped against respective heating plates 10 with their edges sealed liquid-tight against one another. The support walls 2 define with the membranes respective plate frames 3. The membrane filter elements 1 form between themselves and the respective heating plate 10 filter chambers 4 which are supplied with the suspension to be filtered through the inlet passages 5, a vacuum pump 5a can be connected to the inlet or to the filtrate outlet as may be advantageous.

Each membrane filter element 1 is connected at its periphery to the respective plate frame 3 and comprises the membrane proper 6 which can be displaced to compress the filter cake by the injection of a pressurization fluid into a compartment 6a between the membrane and the support wall 2, e.g. via a pressurizing pump 6b and a valve 6c.

Both sides of the membrane 6 are provided with projections or formations 8 to permit runoff of liquid from the filter cake and on the side turned toward the chamber 4, the membrane 6 is covered by a filter cloth 7 which is clamped to the frame by a bar 7a adjacent the peripheral seal of the respective membrane filter element and the plate 10. Below the filter cloth 7, therefore, a channel system for filtrate is formed in the membrane 6 which includes bores 9 all around the peripheries thereof. The bores 9 communicate with the filtrate runoff channels 16 in the plate frames 3 and which communicate in turn with the corner channels 11 and run to the channels 11.

Figure 2:
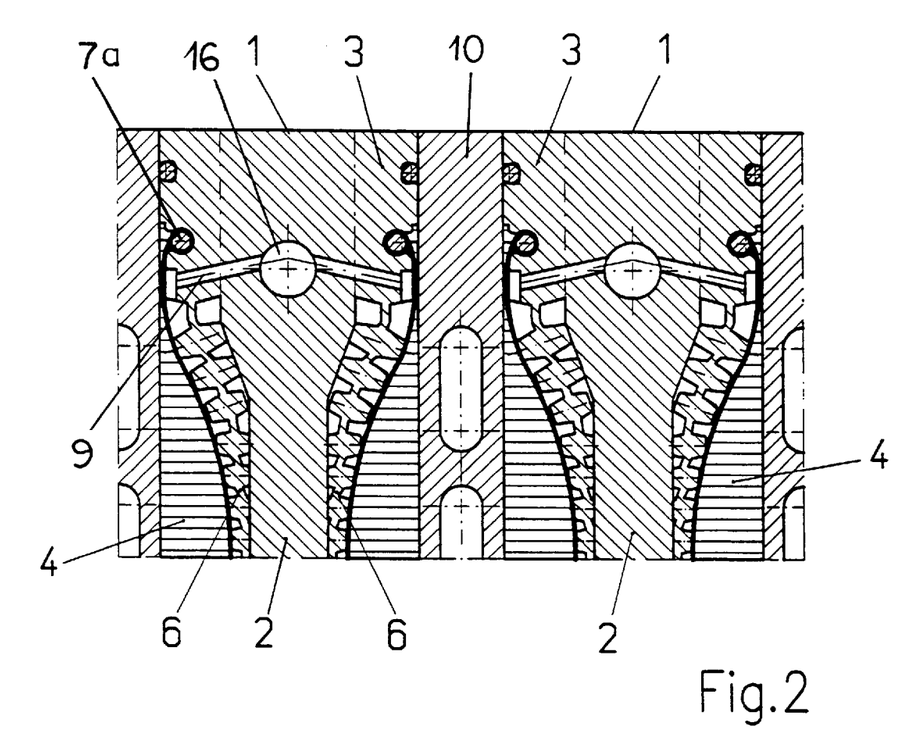
FIG. 2 is a section through a portion of the filter press of FIG. 1 to a larger scale and shown during the filtration phase
Figure 3:
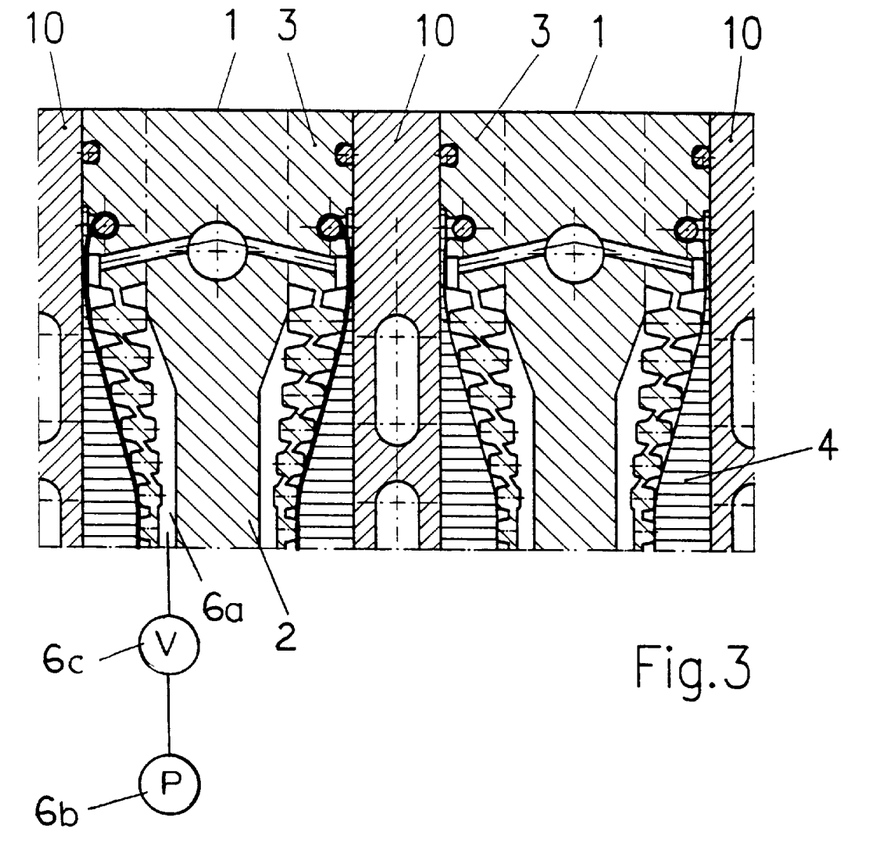
FIG. 3 is a section corresponding to that of FIG. 2 during the afterpressing and drying phase.

FIG. 2 shows a section through the filter press of FIG. 1 during the filtration phase while FIG. 3 shows the membrane filter elements during the afterpressing and drying phase.

Between each two membrane filter elements 1, a heating element or plate 10 which bears directly against the filter cake in the respective chamber 4 and this plate is composed of a material having high thermal conductivity, especially a metal such as aluminum. Since the heating elements bound the filter elements 4 and are in direct contact with the respective cake, an optimal heat transfer to the filter cake is assured. As has been mentioned, the vacuum is applied via the filtrate outlet 16 or the suspension inlet 17 and thus serves not only to draw off the moisture but also to lower the boiling temperature.

Figure 4:
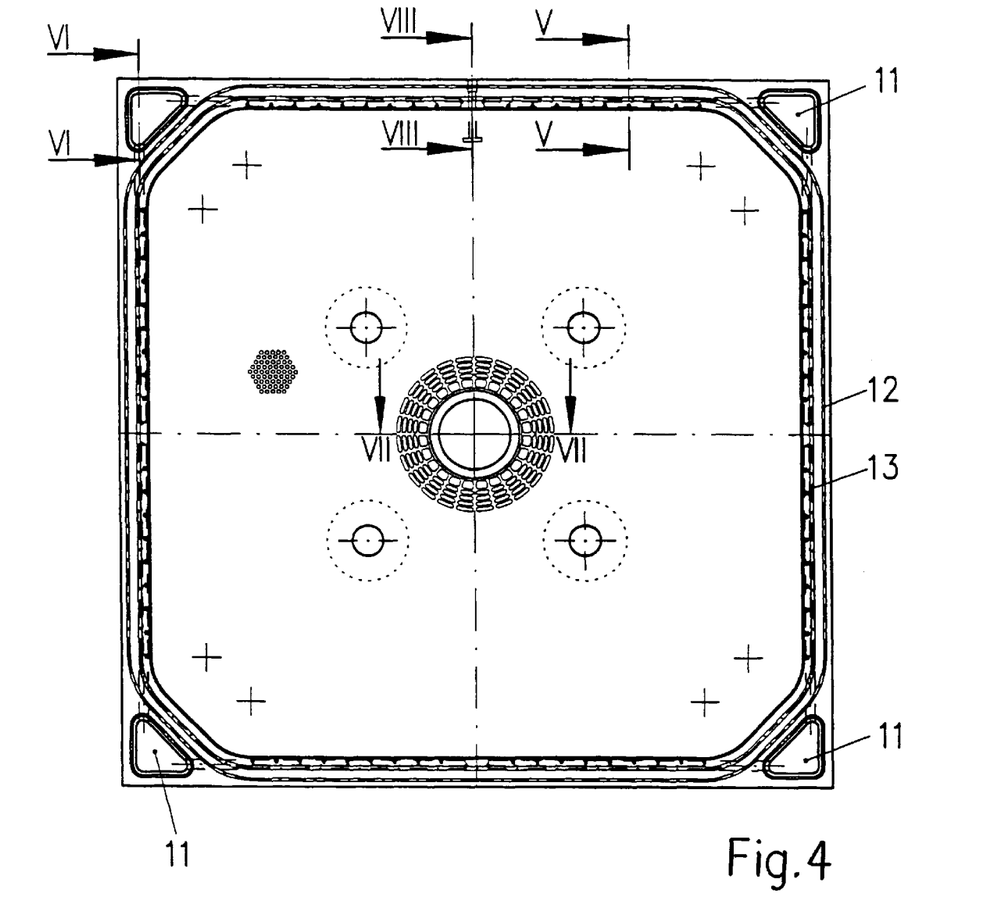
FIG. 4 is a plan view of a membrane filter element of the invention.

To maximize the efficiency and ensure a uniform distribution of the vacuum, filtrate discharge bores are provided over the entire periphery of the filter surface. Additionally and as is especially visible from FIG. 4, the filtrate discharge passages 11 located at the corner regions of the membrane filter elements have a triangular configuration which increases the discharge cross section and further improves the efficiency of the vacuum in eliminating residual moisture from the filter cake. The various sections of the structure shown in FIG. 4 can be seen in FIGS. 5–8.

Figure 5:
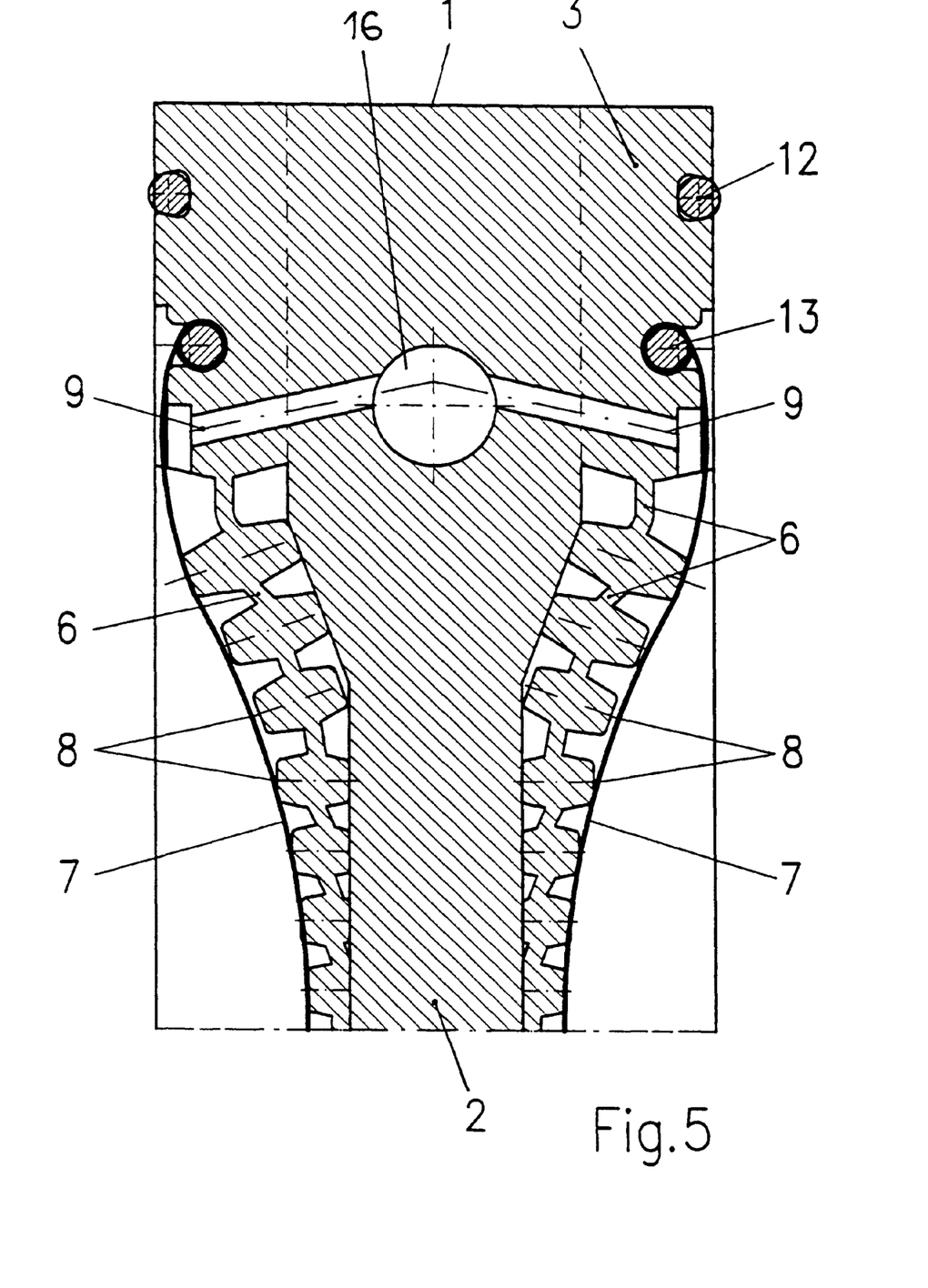
FIG. 5 is a section along the line V—V of FIG. 4.
Figure 6:
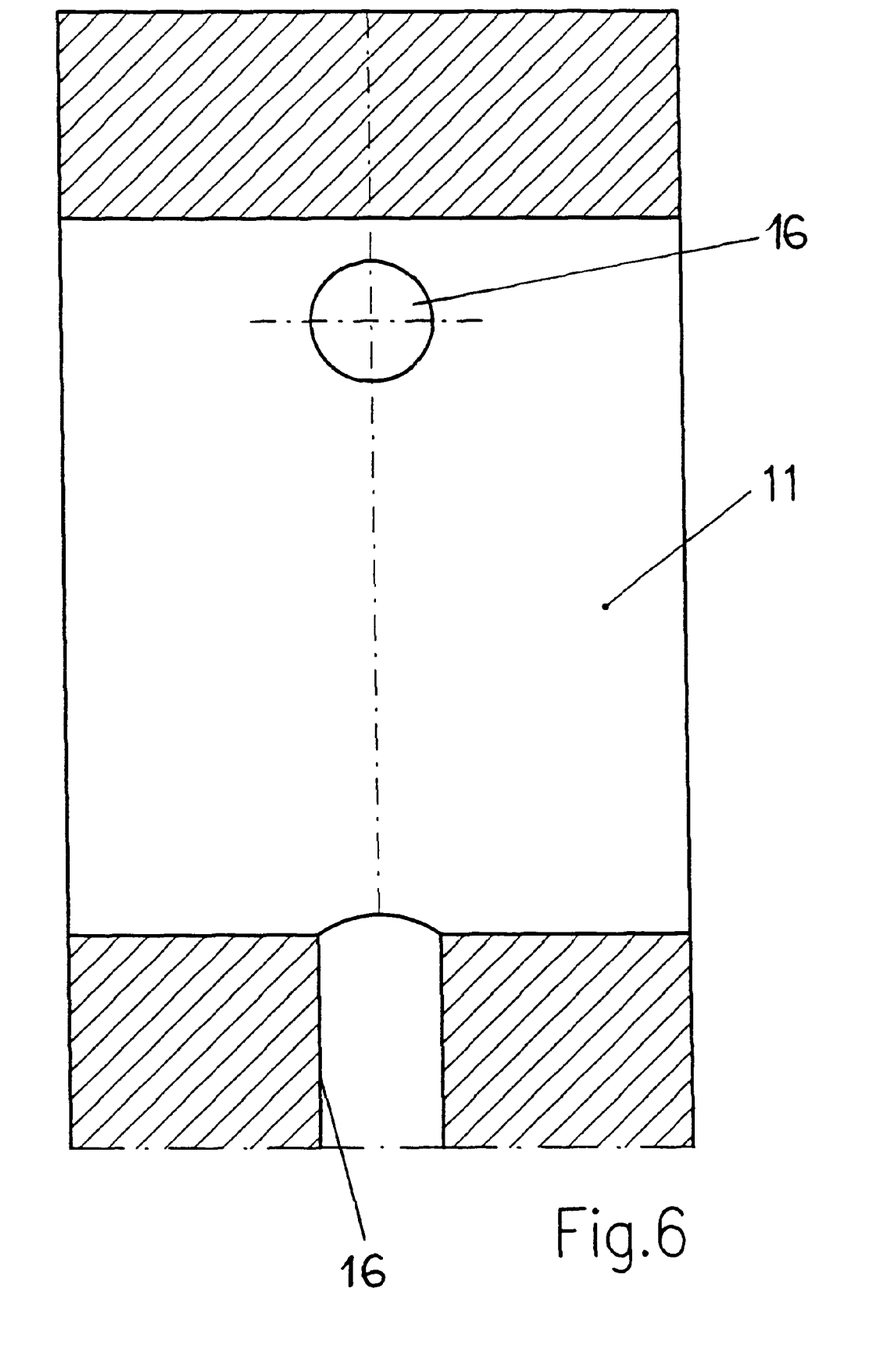
FIG. 6 is a section along the line VI—VI of FIG. 4.
Figure 7:
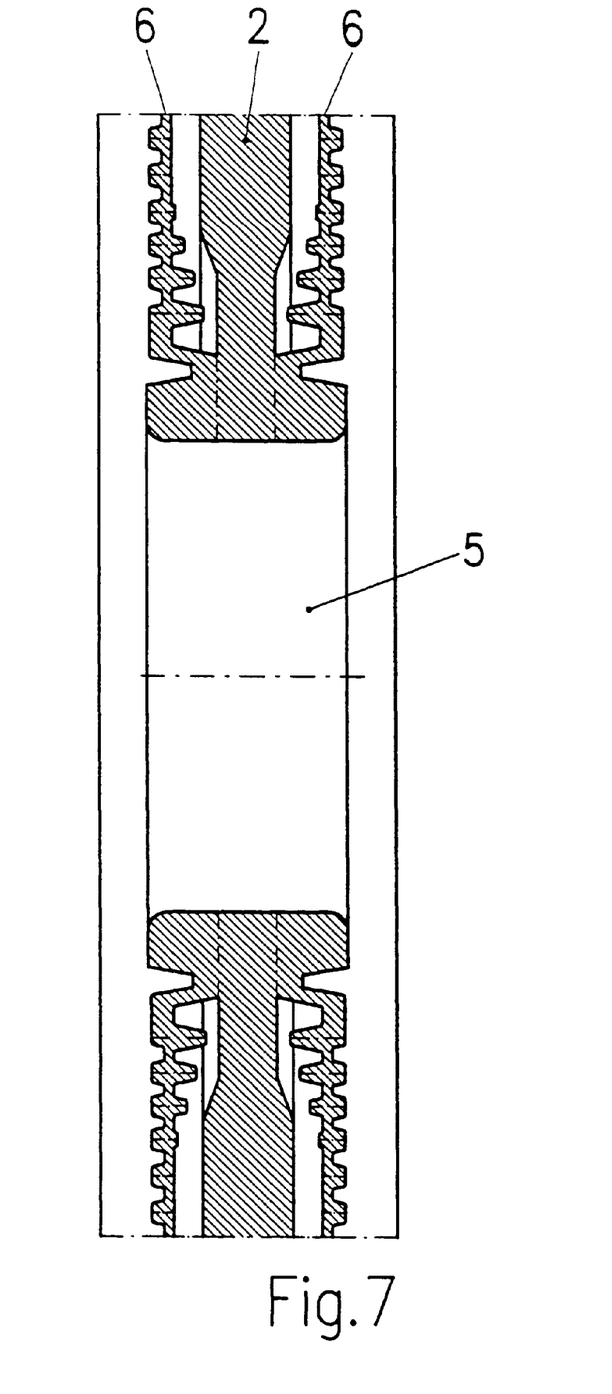
FIG. 7 is a section along the line VII—VII of FIG. 4.
Figure 8:
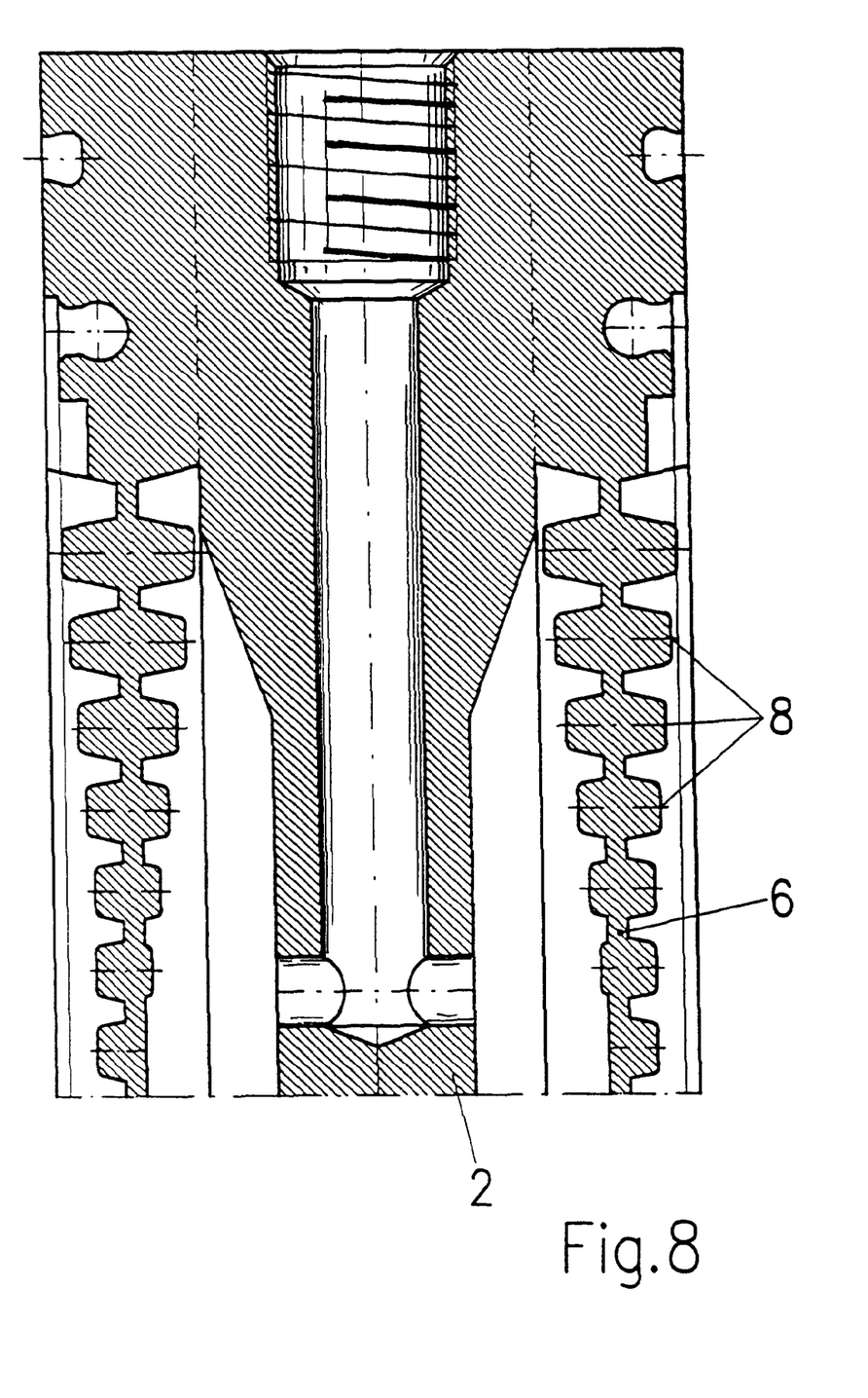
FIG. 8 is a section along the line VIII—VIII of FIG. 4.

To exclude pressure losses in the interior of the filter press, the plate frames 3 are provided with a vacuum-tight edge seal 12 into which the filter cloth clamp 13 is integrated as has been shown in detail in FIG. 5. The filter cloth is held in the groove of the filter clamp by a clamping ring as has already been described.

The heating plate 10 on its surfaces facing the respective membrane filter elements can be planar as has been shown in the drawing, or dished to form a filter cake compartment and preferably is free from drainage formations. To prevent excessive adhesion of the dried filter cake to the heating elements 10, the surfaces of the latter at least in the regions of contact with the filter cake are provided with antiadhesive coatings, preferably of PTFE.

The heating elements 10 can be fabricated in one piece or can be made in a plurality of pieces with the parts being cemented together, welded together or bolted together through the intermediary of seals.

Figure 9:
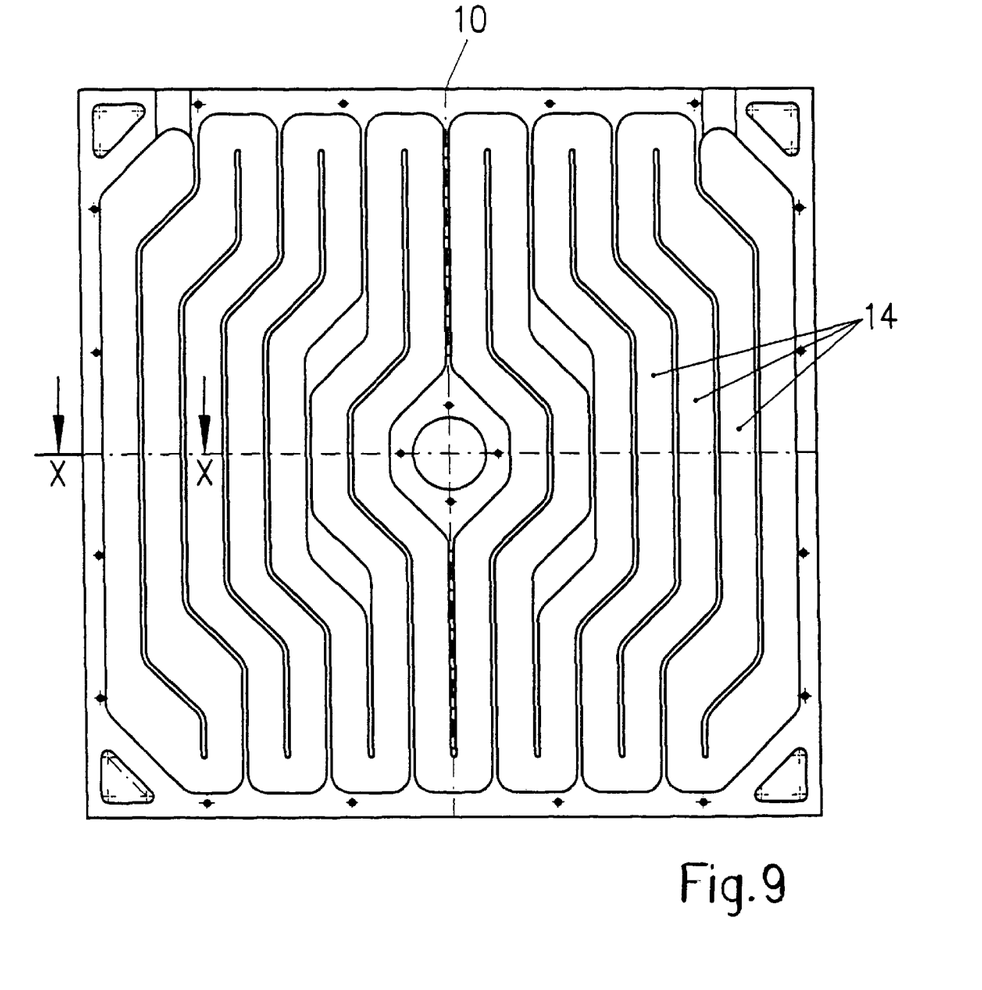
FIG. 9 is a section through a heating element or plate of the invention.
Figure 10:
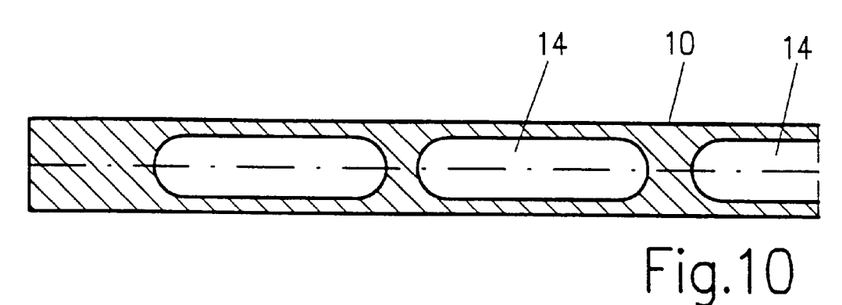
FIG. 10 is a section along the line X—X of FIG. 9.

As is especially apparent from FIGS. 11a to 11e, the heating elements can have round and/or oval and/or rectangular heating passages. The uniform distribution of the heat can be ensured by providing a meandering configuration of the heating passages 14 as has been shown in FIG. 9.

Figure 11A:
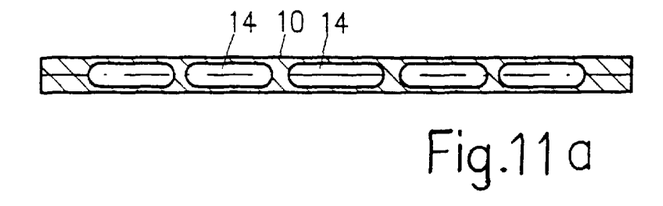
FIGS. 11a–11e are cross sectional views of different configurations of the heating element.
Figure 11B:
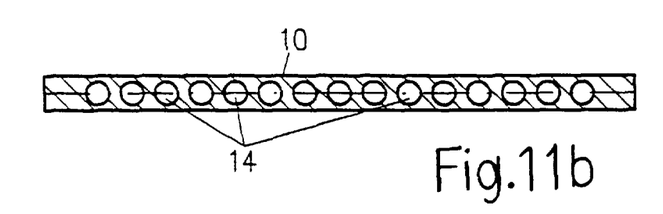
Figure 11C:
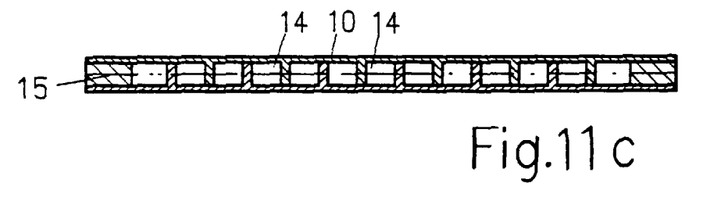
Figure 11D:
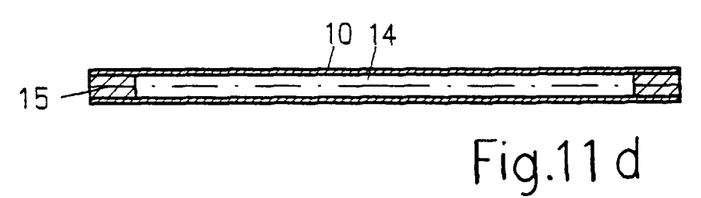
Figure 11E:
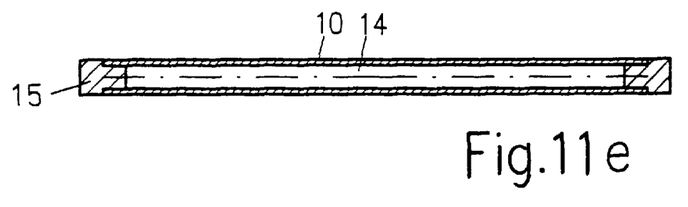

Finally, the heating elements 11 can be thermally insulated in their edge regions as will be apparent from FIGS. 11d and 11e in which thermal insulation is shown at 15 to form the frames for the heating elements 10.

The filter press which has been described is particularly suitable for recovering solids in the filter chambers 4 and pressing those accumulations of solids into filter cakes via the respective membranes. As part of the filtration process or as part of a subsequent washing process, the filter cakes are subjected to a mechanical afterpressing phase in which the membranes apply mechanical pressure to the filter cakes and squeeze liquid therefrom. Simultaneously with the afterpressing phase, the filter chambers are evacuated and the heating plates 10 are heated to a temperature which is sufficient to generate a vapor front which propagates through the filter cake uniformly and in a plane to drive the remaining liquid to the drainage surfaces of the unheated membranes 6. The heating is effected so uniformly that local vapor breakthrough cannot occur. The filter cakes can be maintained under the afterpressing pressure of the membranes 6 and this membrane pressure can be greater than the vapor pressure of the liquid in the filter cakes. This stabilizes the filter cake during shrinkage with loss of liquid therefrom. The fluid introduced into the compartments 6a can be heated or cooled as has been described.

We claim:

1. A process for separating solids from a liquid of a suspension in filter chambers each provided with a respective unheated flexible membrane filter element covered by a filter cloth and a rigid wall and in which a respective filter cake is formed in each chamber and is subjected to an after-compression phase, said process comprising drying the respective filter cakes by the steps of:

(a) physically displacing each membrane filter element toward the respective rigid wall by introducing a pressure fluid into a compartment behind each membrane filter element to after-compress each filter cake between a respective membrane filter element and a respective rigid wall;

(b) while maintaining the filter cake under after-compression between the respective membrane and wall, heating each filter cake along the respective rigid wall;

(c) simultaneously subjecting the filter cakes to a vacuum to reduce a boiling point of the liquid in each of said filter cakes; and (d) controlling the temperature to which each filter cake is heated at the respective rigid wall so that a vapor layer is formed at the respective rigid wall and is propagated uniformly through the respective filter cake to drive residual liquid out of said filter cakes toward drainage surfaces of respective unheated membrane filter elements, the heating being effected over the entire area of each filter cake in contact with the respective rigid wall so that a transition zone between each vapor layer and the respective residual liquid of each filter cake transits through the filter cake homogeneously in a plane and without local vapor breakthroughs.

2. The process defined in claim 1 wherein each filter cake is maintained under a pressure of said after-compression phase as applied by the respective membrane filter element adjusted to be greater than a vapor pressure of the liquid in the cake during drying.

3. The process defined in claim 2, further comprising the step of controlling a temperature of a medium for pressurization of said membrane filter elements.

4. The process defined in claim 2 wherein said vacuum is applied to said chambers through a filtrate outlet.

5. The process defined in claim 2 wherein said vacuum is applied to said chambers through a suspension inlet.

* * * * *